United States Patent
Simm et al.

(10) Patent No.: US 7,634,835 B2
(45) Date of Patent: Dec. 22, 2009

(54) SUCTION EXTRACTION SYSTEM OF AN ELECTRIC POWER TOOL, AND ELECTRIC POWER TOOL HAVING A SUCTION EXTRACTION SYSTEM

(75) Inventors: Robert Simm, Oekingen (CH); Markus Weber, Baetterkinden (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/913,779

(22) PCT Filed: Jul. 3, 2006

(86) PCT No.: PCT/EP2006/063794

§ 371 (c)(1),
(2), (4) Date: Nov. 7, 2007

(87) PCT Pub. No.: WO2007/017313

PCT Pub. Date: Feb. 15, 2007

(65) Prior Publication Data

US 2008/0155779 A1    Jul. 3, 2008

(30) Foreign Application Priority Data

Aug. 9, 2005  (DE) ....................... 10 2005 037 535

(51) Int. Cl.
*B23B 47/34* (2006.01)
(52) U.S. Cl. .................. 15/339; 15/415.1; 408/67; 451/456

(58) Field of Classification Search ............... 15/339, 15/415.1; 83/100; 408/67; 144/252.1; 451/356, 451/456; *B23B 47/34*
See application file for complete search history.

(56) References Cited

U.S. PATENT DOCUMENTS

| 5,467,835 A | 11/1995 | Obermeier et al. |
| 2004/0020671 A1 | 2/2004 | Lamprecht et al. |
| 2004/0124721 A1 | 7/2004 | Pfisterer et al. |
| 2005/0281627 A1 | 12/2005 | Britz |

FOREIGN PATENT DOCUMENTS

| DE | 196 03 528 | 8/1997 |
| EP | 0 345 896 | 12/1989 |
| EP | 0 548 782 | 6/1993 |
| EP | 0 855 244 | 7/1998 |
| EP | 1 459 842 | 9/2004 |
| GB | 2 309 660 | 8/1997 |
| WO | 2005/025792 | 3/2005 |

Primary Examiner—David A Redding
(74) Attorney, Agent, or Firm—Michael J. Striker

(57) ABSTRACT

A suction extraction system of an electric power tool has a housing, a cup-shaped part of the housing, a gear-containing chamber, a suction extractor for receiving air contaminated with drilling material, and a suction conduit for extracting the air by suction, the suction extractor being connectable to the electric power tool via a connection element, wherein the suction conduit is located at least partially inside the housing of the electric power tool and is sealed from outside by a self-closing closure.

7 Claims, 2 Drawing Sheets

SUCTION EXTRACTION SYSTEM OF AN ELECTRIC POWER TOOL, AND ELECTRIC POWER TOOL HAVING A SUCTION EXTRACTION SYSTEM

CROSS-REFERENCE TO RELATED APPLICATION

The invention described and claimed hereinbelow is also described in German Patent Application DE 10 2005 037 539.9 filed on Aug. 9, 2005. This German Patent Application, whose subject matter is incorporated here by reference, provides the basis for a claim of priority of invention under 35 U.S.C. 119(a)-(d).

BACKGROUND OF THE INVENTION

The invention is based on a suction extraction system of an electric power tool and on an electric power tool with a suction extraction system, as generically defined by the preambles to the independent claims.

Electric power tools with suction extraction systems, and suction extraction systems for collecting or removing the chips, dust particles, or drilling powder and the like that occur when the electric power tool is used, are known in manifold forms.

In external extraction by suction, a suction blower located in the electric power tool feeds the dust into a dust container mounted on the electric power tool. As soon as a connection with the electric power tool is necessary, the air stream is carried away through a hose or tube located outside the housing. A disadvantage here is that the hose or tube forms parts that hang freely, which on the one hand is visually unattractive and on the other restricts the freedom of motion.

An independent suction extractor is also known that is integrated into the tool and requires no additional drive motor. In that case, a separate suction blower is necessary.

SUMMARY OF THE INVENTION

Accordingly, it is an object of the present invention to provide a suction extraction system of an electric power tool, and an electric power tool having a suction extraction system, which is a further improvement of the existing systems and tools.

A suction extraction system according to the invention of an electric power tool includes a suction extractor for receiving air contaminated with drilling material and also includes a suction conduit for extracting the air by suction, in which the suction conduit is located at least partially inside the housing. It is advantageous that the air is not carried away to outside the electric power tool but instead inside it. This enhances the freedom of movement with the electric power tool and prevents the risk that a person using the electric power tool might become caught somewhere. The overall impression of the electric power tool from outside is also visually attractive, since no hoses and the like hanging from it are visible.

In one embodiment of the suction extraction system, the suction conduit can be located in a gear chamber of the electric power tool. An air course in the suction conduit can be defined at least partially by the cup part of the housing and by the housing, in particular the housing shell. A fixed connection with the power tool can thus be furnished. Favorably, in this embodiment no separate suction conduit has to be embodied, which simplifies the construction of the suction extraction system of the invention. In a practical aspect, there must be good sealing of the air course in order to protect the grease-lubricated gear against being invaded by dust. Filters may also be provided at a suitable point, for removing coarse dust particles from the air stream.

In an alternative embodiment, a separate suction conduit can also be embodied inside the housing.

The suction extraction of the air is preferably done via an underpressure, which is generated in particular by a motor blower located in the housing. Advantageously, a separate suction blower thus need not be made available, which again simplifies the construction, economizes on production costs, and reduces the likelihood that repair will be needed. In a gear construction with a layshaft, it is advantageously unnecessary to adapt the suction extraction system to the size of the power tool, since the existing free spaces are sufficient for the suction extraction of the air stream contaminated with drilling material.

The extracted air stream can then be collected in a collection container, located for instance outside the electric power tool. The extracted dust can then remain in the collection container and has to be emptied from time to time.

Favorably, the suction conduit of the device is sealed off from the outside by a self-closing closure. The closure may be embodied in such a way that it opens automatically when the suction extractor is connected to the electric power tool. The simple assembly of the suction extractor with the electric power tool is advantageous here.

An electric power tool of the invention includes a suction extraction system with a suction extractor, for receiving air contaminated with drilling material, and a suction conduit, for extracting the air by suction; the suction conduit is located at least partially inside a housing of the electric power tool. In particular, the suction conduit can communicate operatively with an underpressure region of a motor blower. Thus an electric power tool is advantageously furnished that makes virtually dust-free work possible and protects both the user and the work space. The suction extraction of the air stream contaminated with drilling material is done simply and without an additional suction blower, via the suction conduit integrated at least partially with the electric power tool.

Further embodiments, aspects, and advantages of the invention will become apparent, independently of how they are summarized in claims, without limitation to the general applicability, from exemplary embodiments of the invention described below in conjunction with drawings.

DESCRIPTION OF THE PREFERRED EMBODIMENTS

Figure 1:
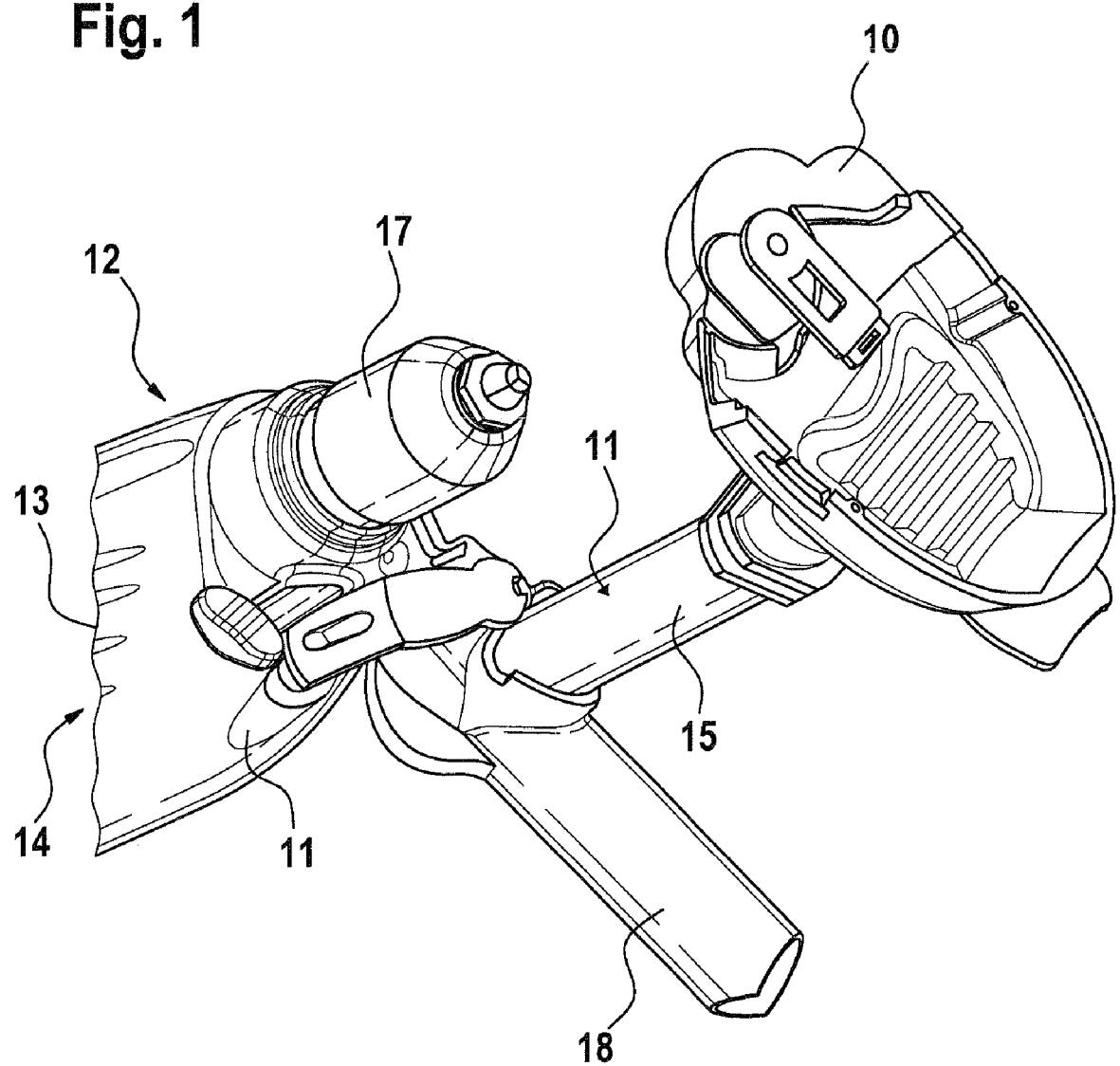
FIG. 1 is a perspective view of an electric power tool with a suction extraction system; in accordance with the present invention.

Identical elements are identified by the same reference numerals throughout the drawings.

In FIG. 1, a perspective view of an electric power tool, equipped as a power drill, with a suction extraction system is shown. The suction extraction system includes a suction extractor 10 for receiving air contaminated with drilling material and a suction conduit 11 for suction extraction of the air. The suction extractor 10 is embodied in collarlike form and is placed on a wall face in such a way that the dust produced in drilling is caught directly at the site where it originates and introduced into the suction extraction system. The suction extractor 10 is connected to the electric power tool via a connection element 15 that is mounted in the region of a depth stop of the electric power tool and that catches the drilling material fed out of the drill hole by the drill. The connection element 15 is thus a component of the suction conduit 11. This conduit is located partially inside a housing 12 of the electric power tool, although this cannot be seen in FIG. 1. With the aid of an additional handle 18, the electric power tool with the suction extractor 10 mounted on it is easier to hold.

Figure 2:
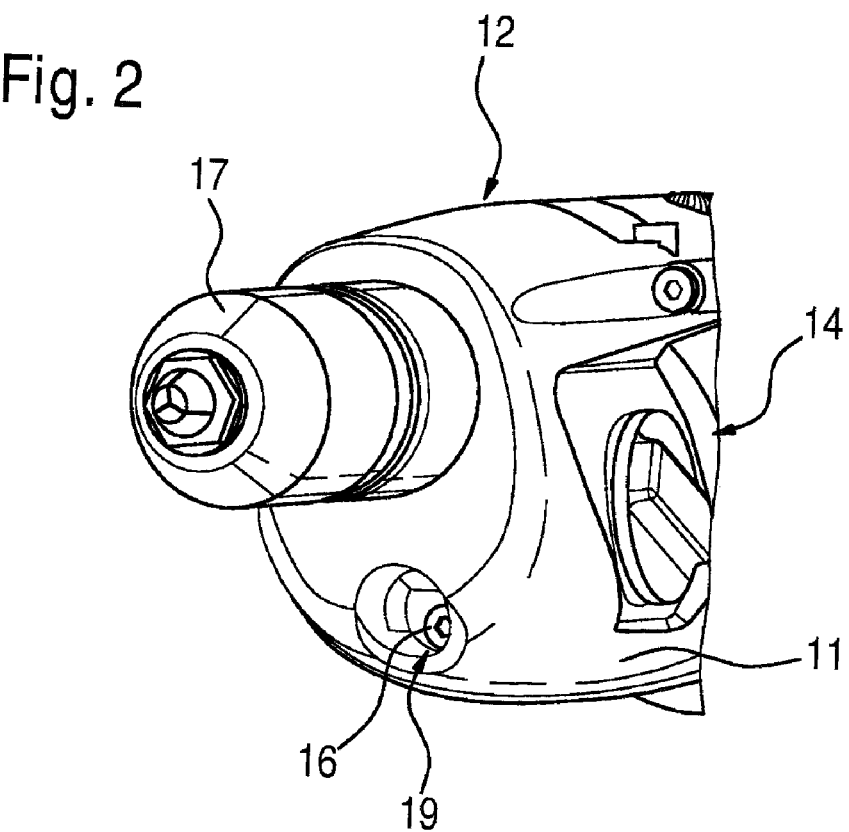
FIG. 2 is a detail in a front view of the electric power tool; and in accordance with the present invention.

In FIG. 2, a detail in front view of an electric power tool located in a housing 12 is shown. A tool bit is mounted in a tool bit holder 17.

On the face end of the electric power tool below the tool bit holder, there is a closure 16 in the housing 12 that seals off the suction conduit 11 of the device from the outside. The closure 16 is embodied in self-closing fashion. When the suction extractor 10 or the connection element 15 is connected to the electric power tool, the closure 16 can be opened automatically.

Figure 3:
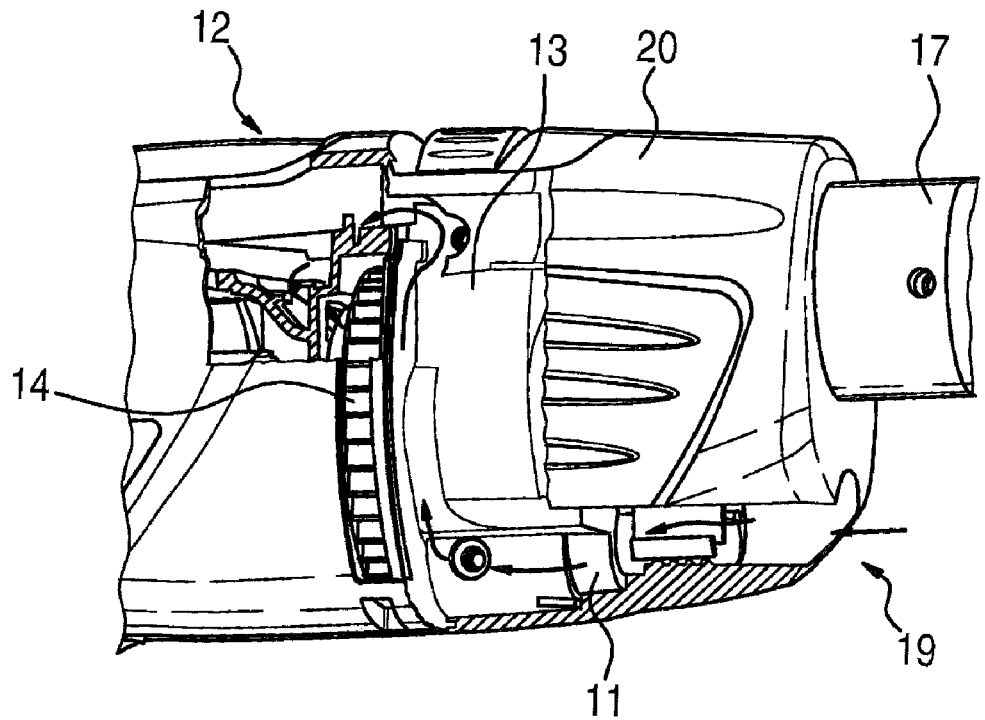
FIG. 3 is a longitudinal section through the electric power tool in accordance with the present invention.

In the view in FIG. 3, the precise embodiment of the suction conduit 11 of the device can be seen; it is located inside the housing 12 of the electric power tool, in particular in already-existing free spaces. The suction conduit 11 is located between the intake opening 19 and an outflow opening, not shown, that is preferably located on a lateral surface of the housing.

The filtered air stream passes via the intake opening 19 into the suction conduit 11 located in the housing 12. The intake opening 19 is shown in its open state, so that the automatically closing and opening closure 16 cannot be seen. After the air stream has entered through the intake opening 19, it is conducted via existing free spaces within the gear chamber 13. The air course in the suction conduit 11 of the device is bounded by the cup part 20 of the housing 12 and by the housing 12. The suction extraction of the air is effected via an underpressure that is generated by a motor blower 14 located in the housing 12. To this extent, the suction conduit 11 is in operative communication with the underpressure region of the motor blower 14.

The air course is represented by arrows. The air stream first enters the housing 12 of the electric power tool counter to the drilling direction, at the intake opening 19; it is then first carried farther inward essentially parallel, leads vertically upward in a vertical partition region between the cup part 20 of the housing 12 and the shell, and is then carried onward, essentially parallel to the intake direction, in the upper region of the housing 12 before being deflected into the air stream of the fan.

The invention claimed is:

1. A suction extraction system of an electric power tool, comprising a housing (12), a cup-shaped part (20) of the housing (12), a gear-containing chamber (13), a suction extractor (10) for receiving air contaminated with drilling material, and a suction conduit (11) for extracting the air by suction, the suction extractor (10) being connectable to the electric power tool via a connection element (15), wherein the suction conduit (11) is located at least partially inside the housing (12) of the electric power tool and is sealed from outside by a self-closing closure (16).

2. The suction extraction system as defined by claim 1, wherein the suction conduit (11) is located in the gear-containing chamber (13) of the electric power tool.

3. The suction extraction system as defined by claim 1, wherein an air course in the suction conduit (11) is defined at least partially by the cup-shaped part (20) and by the housing (12).

4. The suction extraction system as defined by claim 1, wherein the extraction of the air by suction is effected via an underpressure generated by a motor blower (14) located in the housing (12).

5. The suction extraction system as defined by claim 1, wherein the closure (16) is openable automatically upon connection of the suction extractor (10) to the electric power tool.

6. An electric power tool, having a housing (12) and a suction extraction system, in which the suction extraction system includes at least one suction extractor (10) for receiving air contaminated with drilling material and also includes a suction conduit (11) for extracting the air by suction, wherein the suction conduit (11) is located at least partially inside the housing (12).

7. The electric power tool as defined by claim 6, wherein the suction conduit (11) is operatively in communication with an underpressure region of a motor blower (14).

* * * * *